(12) United States Patent
Maes

(10) Patent No.: US 7,869,788 B2
(45) Date of Patent: *Jan. 11, 2011

(54) DEVICE BILLING AGENT

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 12/173,797

(22) Filed: Jul. 15, 2008

(65) Prior Publication Data

US 2008/0268813 A1 Oct. 30, 2008

Related U.S. Application Data

(63) Continuation of application No. 11/088,702, filed on Mar. 23, 2005, now Pat. No. 7,426,381.

(51) Int. Cl.
*H04M 11/00* (2006.01)

(52) U.S. Cl. .............. 455/406; 455/405; 455/407; 455/408; 455/425

(58) Field of Classification Search .......... 455/405, 455/406, 407, 408, 425
See application file for complete search history.

(56) References Cited

U.S. PATENT DOCUMENTS

| | | | |
|---|---|---|---|
| 6,035,025 A | 3/2000 | Hanson | |
| 6,044,403 A | 3/2000 | Gerszberg et al. | |
| 7,137,003 B2 | 11/2006 | Krishnan et al. | |
| 2002/0120857 A1 | 8/2002 | Krishnan et al. | |
| 2002/0176579 A1 | 11/2002 | Deshpande et al. | |
| 2003/0233322 A1 | 12/2003 | Uchida et al. | |
| 2004/0044623 A1 | 3/2004 | Wake et al. | |
| 2004/0098715 A1 | 5/2004 | Aghera et al. | |
| 2004/0209595 A1 | 10/2004 | Bekanich | |
| 2005/0154933 A1 | 7/2005 | Hsu et al. | |
| 2005/0210499 A1 | 9/2005 | Shima | |
| 2006/0217107 A1 | 9/2006 | Maes | |

OTHER PUBLICATIONS

Office Action dated Dec. 20, 2006, issued in U.S. Appl. No. 11/088,702.
Office Action dated Sep. 25, 2007, issued in U.S. Appl. No. 11/088,702.
Office Action dated Jan. 25, 2008, issued in U.S. Appl. No. 11/088,702.
Notice of Allowance dated May 16, 2008, issued in U.S. Appl. No. 11/088,702.

*Primary Examiner*—David Q Nguyen
(74) *Attorney, Agent, or Firm*—Townsend and Townsend and Crew, LLP

(57) ABSTRACT

Access devices using billing agents and methods are disclosed. In one embodiment, the method comprises capturing, at an access device, a communication to be transmitted from the access device. The method further comprises determining billing information about the communication and transmitting, from the wireless communications device, the billing information to a billing system.

15 Claims, 6 Drawing Sheets

DEVICE BILLING AGENT

CROSS-REFERENCES TO RELATED APPLICATIONS

This application is a continuation of and claims priority from U.S. patent application Ser. No. 11/088,702, filed Mar. 23, 2005, now U.S. Pat. No. 7,426,381 which is incorporated by reference.

BACKGROUND OF THE INVENTION

Wireless network providers may offer a variety of different billing models to customers. Network providers may charge customers based on data traffic, based on services used (which can include access of content), or a combination of data traffic and service usage. With each of these models, the network provider may use a variety of different rating schemes. The rating schemes may be per usage, per levels of usage, per subscription, or combination of these schemes.

The billing models described above may be undermined when customers use secure networks (e.g., virtual private networks or secure peer to peer networks) to transmit communications. Communications over a secure network are encrypted before transmittal over the network. The network providers may therefore be unable to detect (and therefore bill) or even prevent certain types of communications from being transmitted which threaten the billing models. For instances, network providers may wish to charge users one rate for internet access and a different rate for voice communications. In order to maintain this model, the network providers may want to control or prevent use of Voice over IP (VoIP) solutions. However, the network provider may be unable to detect VoIP communications when customers are using a secure network. As another example, network providers may want to charge users one rate for mobile e-mails and a different rate for Multimedia Messaging Service (MMS) messages. Again, customers may use a secure network to transmit email messages that cannot be detected by the network provider. Thus, the billing models used by network providers may be weakened or destroyed by the use of secure networks.

Network providers may also want to obtain other types of information about a wireless device. This information may

BRIEF SUMMARY OF THE INVENTION

Access devices using billing agents and methods are disclosed. In one embodiment, the method comprises capturing a communication at an access device (e.g., wireless device). The communication is to be transmitted from the access device. Billing information about the communication is determined. By way of example, determining the billing information may include determining communication type (e.g., Multi-media Messaging Service (MMS) message, Short Message Service (SMS) message, Instant Message (IM), email message, voice chat message) associated with the communication and/or determining a length of the communication. The billing information is transmitted from the access device to a billing system. In some instances, the billing information may be encrypted before it is transmitted to the billing system.

In some embodiments, the method may further comprise receiving a request from the billing system for the billing information and the billing information may be transmitted in response to the request. Alternatively, transmitting the billing information may comprise transmitting the billing information at a predetermined time. In these embodiments, the method may also comprise determining additional billing information for a plurality of communications transmitted during a predetermined time interval and transmitting the additional billing information at the predetermined time.

The method may also further comprise transmitting the communication to a recipient. In some aspects, before the communication is transmitted, it is encrypted. The communication may be transmitted over a secure network, such as a virtual private network (VPN).

In other aspects, the method may further comprise capturing, at the access device, a second communication received at the access device. Second billing information is determined which includes information about the second communication. The second billing information is also transmitted to the billing system.

In a second embodiment, a method is disclosed which comprises receiving billing information at a billing system associated with a network provider from an access device communicating on a network. The billing information includes communication information for at least one communication transmitted from the device. In some embodiments, the billing information may be authenticated. A customer of the network provider is billed based at least in part on the billing information.

In some aspects, the method may further comprise before the billing information is received, transmitting a request, from the billing system to the access device, to transmit the billing information. In other aspects, the method may further comprise determining a billing agent on the access device is not active. By way of example, the determining the billing agent is not active may comprise detecting a failed authentication of the access device. The access device may then be reported to the network provider.

An access device is also disclosed. The access device comprises application logic and billing agent logic communicatively coupled with the application logic. The billing agent logic is configured to monitor the application logic and to capture a communication transmitted from the application logic. The billing agent logic also is configured to determine billing information about the communication. A communication component is configured to transmit the billing information to a billing system and to transmit the communication.

Further embodiments may comprise an encryption component, communicatively coupled with the application logic, to encrypt the communication. Alternatively, or additionally, the wireless device may further comprise a secure component (e.g., USIM, SIM). At least a portion of the billing agent logic is stored on the secure component.

A further understanding of the nature and advantages of the present invention may be realized by reference to the remaining portions of the specification and the drawings.

BRIEF DESCRIPTION OF THE DRAWINGS

Illustrative embodiments in accordance with the invention are illustrated in the drawings in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
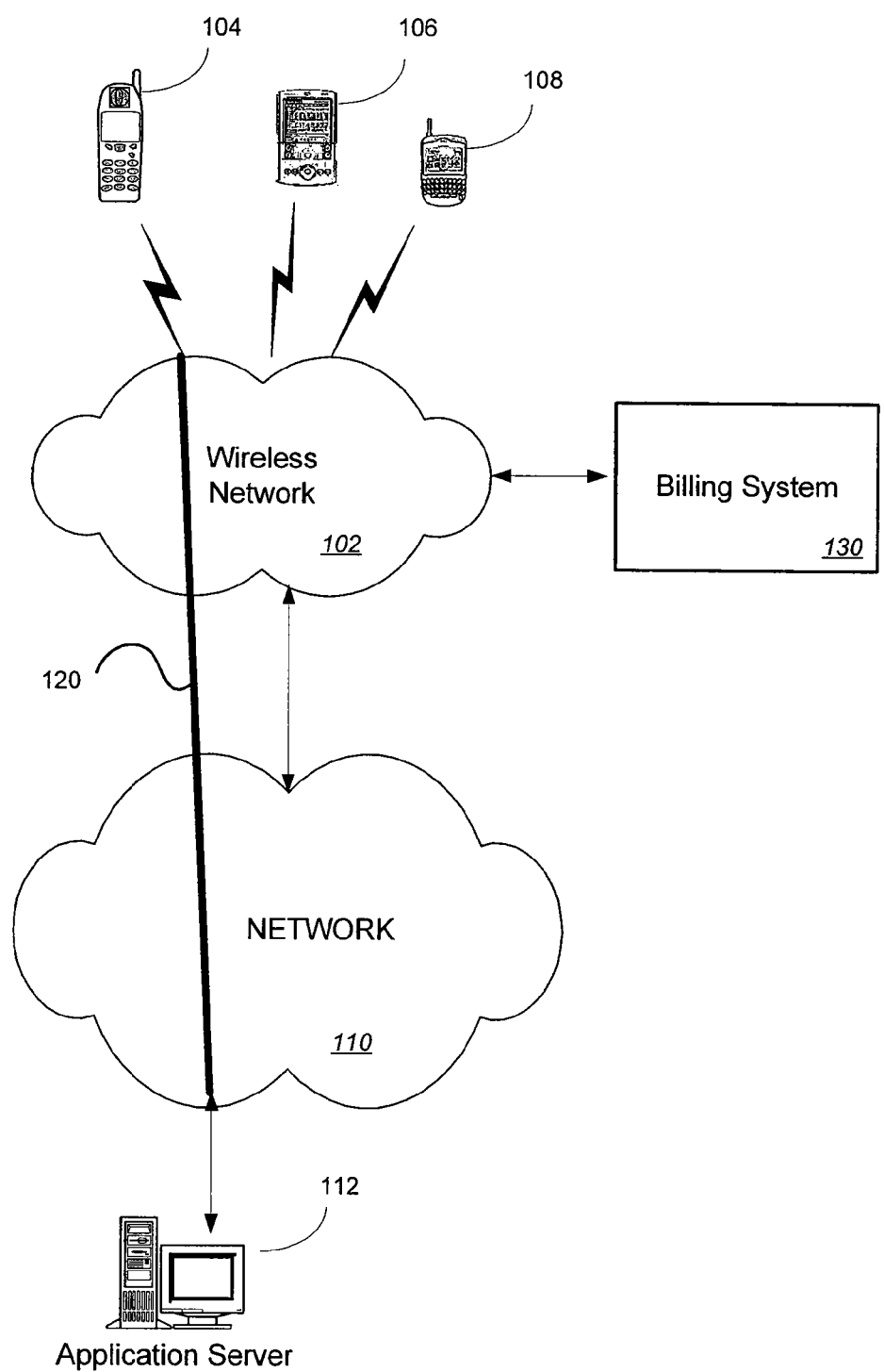
FIG. 1 illustrates an exemplary embodiment of a system that may use device billing agents to monitor communications.

FIG. 1 illustrates an exemplary embodiment of a system that uses device billing agents to monitor and report information used to bill for communications. In FIG. 1, a number of wireless mobile devices 104, 106, 108 are communicatively coupled to wireless network 102. Wireless mobile devices 106, 108, 110 may be mobile telephones, personal data assistants (PDA) with wireless capabilities, laptops with wireless capabilities, wireless devices for receiving email communications (e.g., Blackberry® devices), or other types of wireless device It should be appreciated that wireless network 102 may also have additional wireless mobile devices (not shown) connected thereto.

Wireless network 102 employs a communication format for communications on the network 102. By way of example, the communication format may be Code Division Multiple Access (CDMA), Time Division Multiple Access (TDMA), Global System for Mobile Communication (GSM), WiFi (IEEE 802.11), General Packet Radio Service (GPRS), and other wireless network technologies. In addition to the communication format employed by the wireless network 102, wireless network 102 may also employ proprietary standards for communications.

Wireless network 102 may further be coupled with other networks, such as network 110. Network 110 may be a wide area network, such as the Internet, a local area network (LAN) or other type of network that may allow wireless devices 104, 106, 108 to communicate with server 112 or other servers (not illustrated) coupled with network 110. Other types of networks, such as additional wireless networks provided by other network providers may also be coupled with wireless network 102.

Wireless devices 104, 106, 108 may be able to establish a secure network connection to one or more servers 122, to each other and/or or to other wireless devices communicating on wireless network 102 or other wireless networks. Secure network connection 120 may be virtual private networks (VPN), peer-to-peer networks, or other type of networks over which secured communications may be transmitted between devices. An exemplary secure network connection is illustrated by secure network connection 120 established between wireless device 104 and server 122.

As will be described in further detail below with reference to FIG. 2, wireless devices 104, 106, 108 may each include a device billing agent (not illustrated). Device billing agents may be used to monitor communications transmitted from and/or received by wireless devices 104, 106, 108. Billing information about the communication (e.g., communication type, length) may be determined by the device billing agents and transmitted to a billing system 130 for the provider of wireless network 102. Thus, the wireless network provider may be able to monitor the type and length of communications transmitted and received over a secure network connection 120 to wireless devices 104. This information may be used by the wireless network provider to charge customers. In some embodiments, billing system 130 may be responsible for billing customers, while in alternative embodiments billing system 130 may collect information received from wireless devices 104, 106, 108 and transmit this information to a different system to perform the actual billing.

Although FIG. 1 illustrates billing system 130 communicatively coupled with wireless network 102, in alternative embodiments billing system 130 may be a component of a server communicatively coupled with network 110 or different network. Additionally, in alternative embodiments, other types of access devices (non-wireless devices) used to access networks, such as network 110 or other type of network, may use device billing agents to communicate billing information to a billing system. Thus, billing agents may be implemented on any type of device used to access a network. Other variations are also contemplated.

Figure 2:
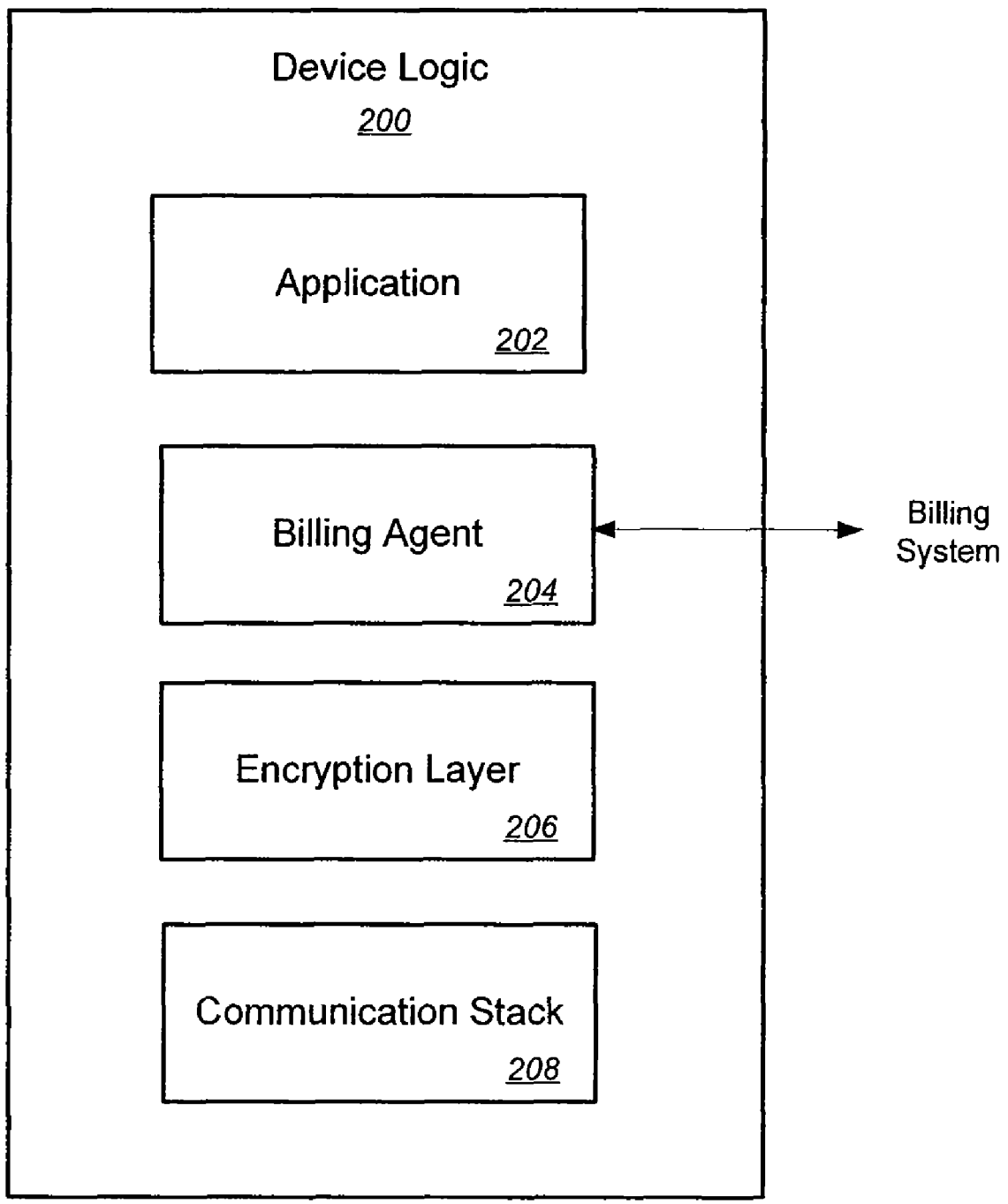
FIG. 2 is a block diagram of exemplary device logic that may be included on a wireless device or other type of access device.

FIG. 2 illustrates an exemplary block diagram of device logic 200 that may be included on a wireless device, such as those illustrated in FIG. 1, or other type of access device. Device logic 200 may include one or more applications 202, billing agent 204 communicatively coupled with application(s) 202, encryption layer 206 communicatively coupled with billing agent 204, and communication stack 208 communicatively coupled with encryption layer 206. Each of the components 202, 204, 206, 208 may include appropriate machine-executable instructions used to perform the functions of the component. It should be appreciated that in alternative embodiments, device logic 200 may include additional components, different components, or fewer components that that illustrated.

Billing agent 204 may be used to monitor communications transmitted from and received by the access device. As illustrated in FIG. 2, billing agent may operate at a layer between application(s) 202 executing on the wireless device (e.g., user application(s) which may send or receive communications over a secure network) and encryption layer 206 used to encrypt/decrypt communications transmitted over a secure network. Thus, billing agent 204 may be used to determine billing information for communications transmitted by access device before the communications are encrypted by encryption layer 206 for transmission over the secure network. Billing agent 204 may also be used to determine billing information for communications received by access device after the received communications are decrypted by encryption layer 206. Billing information may be any type of information used by billing system 204 to charge for access devices. For example, billing information may identify the nature of communication packets (e.g., data, MIME type, signaling), or otherwise determine communication type or length of messages. Billing agent 204 may then transmit this information to a billing system, either as raw information or derived statistical information from one or more communications transmitted and/or received by wireless device. Communication stack 208 may be used to format and transmit the encrypted communications in the wireless communication format and to route received wireless communications to encryption layer 206 for decrypting.

Billing agent 204 may be integrated with an operating system installed on the access device. Communications to/from applications 202 using secure network may then be routed by the operating system through billing agent 204. Thus, integrating the billing system 204 with the operating system may help ensure that applications 202 using secure networks may be monitored by billing system 204.

In some embodiments, billing agent 204 may include features which prevent or help detect tampering with the billing agent 204. For example, measures may be taken to detect changes in operating systems (i.e., re-installation or new installation of an operating system), especially open source operating systems. A changed operating system may be detected by the access device failing authentication when reporting to the network provider or any other suitable mechanism. This may reduce or eliminate the possibility of users disabling the billing agent by re-installing an operating system without the billing agent. As another example, at least a portion of the billing agent 204 logic may be stored on a secure component of the access device. In some aspects, the secure component may be a component needed to operate a wireless device. For instances, at least a portion of billing agent logic 204 may be stored on a Subscriber Identity Module (SIM), a Universal Subscriber Identity Module (USIM)) or other secure hardware component of a wireless device or other type of access device. Other mechanisms and features may also be included to help reduce the possibility of accidental or purposeful disablement of billing agent 204.

Figure 3:
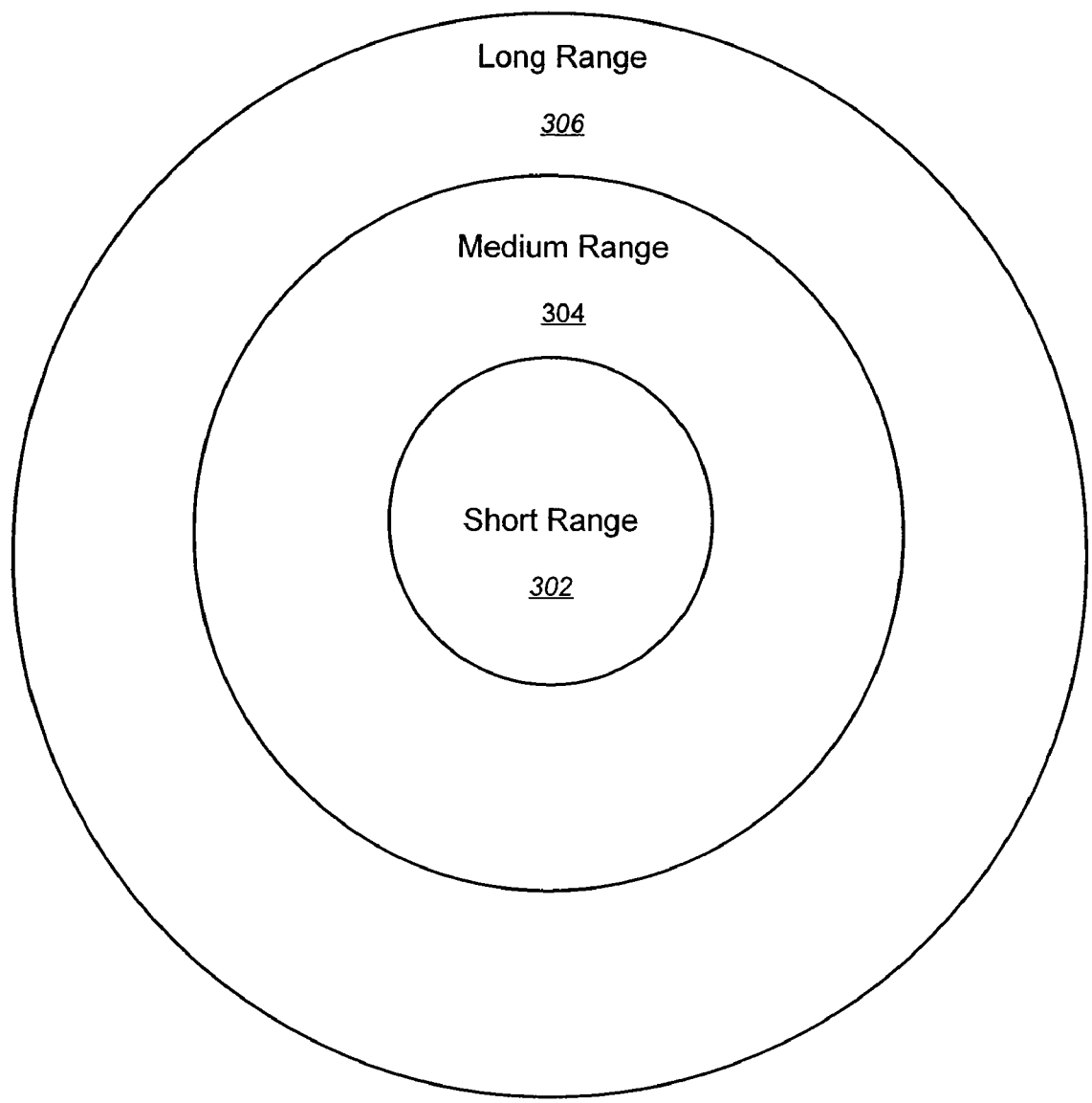
FIG. 3 illustrates a simplified comparison of network technologies.

FIG. 3 illustrates a simplified comparison of wireless network technologies which may use device billing agents. Wireless network technologies include long range networks 306, medium range networks 304, and short range networks 302.

Long range networks 306 may be referred to as wireless wide area networks (WWAN). WWAN networks are high power networks that typically have an access range on the order of several kilometers or more. WWAN technologies include cellular and related technologies such as GSM (Global System for Mobile Communications), GPRS (General Packet Radio Service), CDMA (Code Division Multiple Access), CDPD (Cellular Digital Packet Data), TDMA (Time Division Multiple Access), WCDMA (Wideband Code Division Multiple Access), and other similar types of technologies.

Medium range networks 304, also referred to as wireless local area networks (WLAN), are medium power networks that typically have an access range on the order of tens of meters. Exemplary WLAN technologies include the IEEE 802.11(a), (b), (e) and (g) technologies. Short range networks 302, also known as wireless personal area networks (WPAN), are typically low power networks that have an access range of about 10 meters or less. Examples of WPAN technologies include Bluetooth, HomeRF, IrDA and IEEE 802.15 technologies. It should be appreciated that networks, other than wireless networks, may be made accessible to a user via an access provider.

Figure 4:
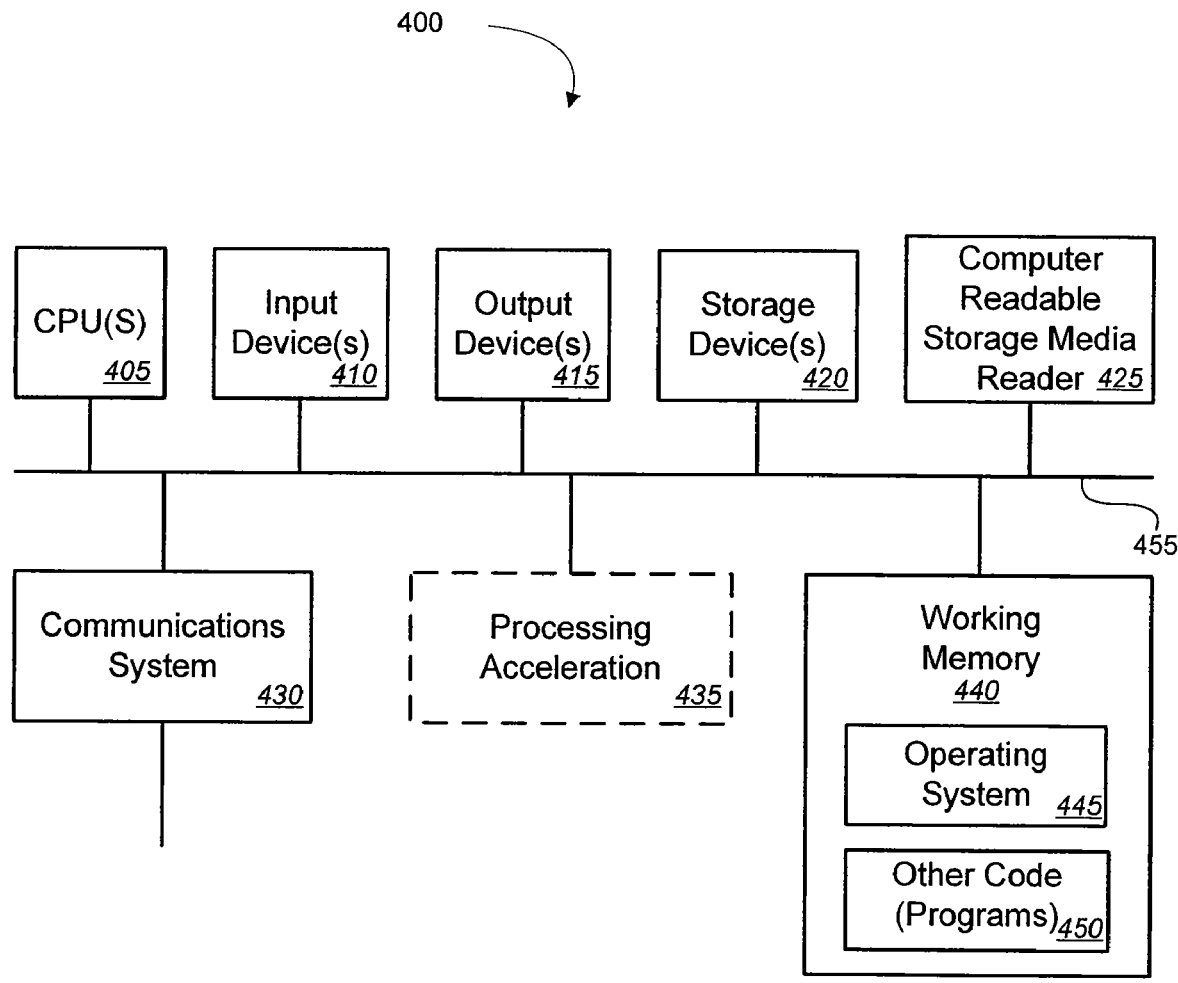
FIG. 4 is a block diagram of a computer system upon which a billing system may be implemented.

FIG. 4 illustrates one embodiment of a computer system 400 upon which a billing system or device billing agent may be implemented. The computer system 400 is shown comprising hardware elements that may be electrically coupled via a bus 455. The hardware elements may include one or more central processing units (CPUs) 405; one or more input devices 410 (e.g., a mouse, a keyboard, etc.); and one or more output devices 415 (e.g., a display device, a printer, etc.). The computer system 400 may also include one or more storage device 420. By way of example, storage device(s) 420 may be disk drives, optical storage devices, solid-state storage device such as a random access memory ("RAM") and/or a read-only memory ("ROM"), which can be programmable, flash-updateable and/or the like.

The computer system 400 may additionally include a computer-readable storage media reader 425; a communications system 430 (e.g., a modem, a network card (wireless or wired), an infra-red communication device, etc.); and working memory 440, which may include RAM and ROM devices as described above. In some embodiments, the computer system 400 may also include a processing acceleration unit 435, which can include a DSP, a special-purpose processor and/or the like The computer-readable storage media reader 425 can further be connected to a computer-readable storage medium, together (and, optionally, in combination with storage device(s) 420) comprehensively representing remote, local, fixed, and/or removable storage devices plus storage media for temporarily and/or more permanently containing computer-readable information. The communications system 430 may permit data to be exchanged with a network and/or any other computer or wireless device.

The computer system 400 may also comprise software elements, shown as being currently located within a working memory 440, including an operating system 445 and/or other code 450, such as an application program. The application programs may implement a billing system, device billing agent, or components of either. It should be appreciate that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed.

Figure 5:
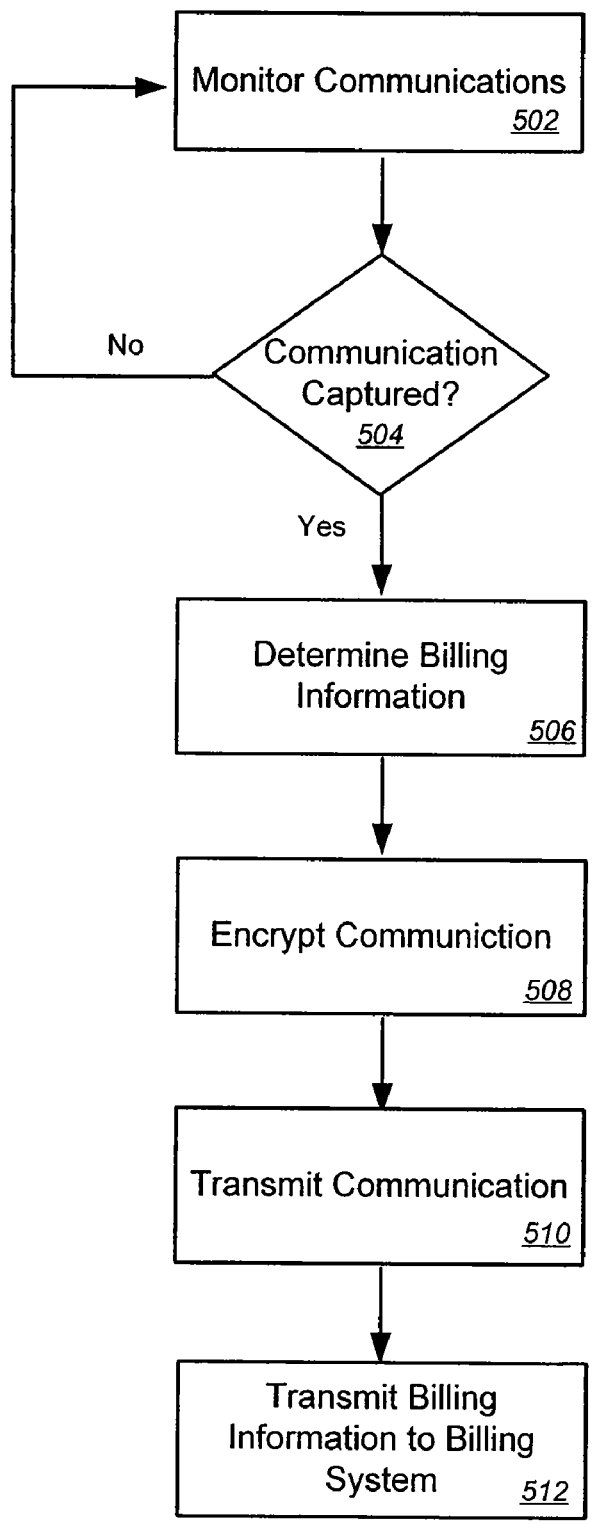
FIG. 5 is a flow diagram illustrating an exemplary method that may be used to obtain billing information for wireless communications.

FIG. 5 illustrates an exemplary method that may be used by a device billing agent to obtain information used to bill for wireless communications or other types of communications. A device billing agent, or other component of an access device, may monitor 502 communications transmitted from the access device. The device billing agent may also or alternatively monitor 502 communications received at the access device. The communications monitored 502 by the device billing agent may be communications transmitted by the access device (e.g., wireless device) and/or received at the access device over a secure network, such as a Virtual Private Network (VPN), peer-to-peer network, or other type of secure network over which encrypted communications are transmitted that may not be read by a provider of the network.

Communications may be monitored 502 by the device billing agent in a manner similar to a firewall application in which communications transmitted or received at an application layer of the wireless communications device are captured. In some embodiments, communications transmitted over a secure network may be captured 504 before the communications are encrypted and/or communications received at the access device may be captured 504 by the billing agent after the communications have been decrypted. If a communication is captured 504 or otherwise detected, the method may continue at block 506. Otherwise, the device billing agent may continue to monitor 502 for communications.

The device billing agent may determine 506 billing information for each communication captured. Billing information may be any type of information about the communication that may be used by a billing system to charge a customer for services. For example, the billing information may include the length of the communication (e.g., data size, time length) and/or the type of communication being transmitted. The type of communication may be determined 506 by the device billing agent at a high level by determining the nature of the communication packet (e.g., data, MIME type, signaling) captured. In some aspects, the device billing agent may make lower level determinations about the communication type, for example, by classifying the type of data exchanged. Data classifications may vary depending upon the type of wireless device. Exemplary data classifications include Multi-Media Messaging Service (MMS) message, Short Message Service (SMS) message, Instant Message (IM), email message, or voice chat message. Other types of classifications may also be used by device billing agent. In alternative embodiments, the device billing agent may not classify data when it is determining 506 billing information about a communication, but may instead transmit billing information about the communication that may allow billing system to perform the classification of data.

In some embodiments, the method may include encrypting 508 the communication for transmittal over a secure network. In other embodiments, the communication captured by the billing agent may not be transmitted over a secure network or may have been a communication received at the access device (which may have been decrypted) and thus block 508 may not be performed. In embodiments in which the communication is to be transmitted (over a secure or other type of network), the method may further include transmitting 510 the communication to a designated recipient.

The device billing agent transmits 512 the billing information determined 506 about the communication to a billing system or other designated component associated with the network provider. The information may be transmitted 512 approximately at the time the billing information is determined 506 for a communication (i.e., real time), in response to a request, or a predetermined time intervals. In some embodiments, the billing information may be encrypted and/or signed by the billing agent before it is transmitted 512. If the information is being transmitted 512 in response to a request, a requester associated with the request may be first authenticated to help prevent unauthorized transmittal 512 of information.

In embodiments in which the billing information is transmitted at request or at predetermined time intervals, billing information determined 506 for communications over the time interval since a previous transmittal of billing information may also be transmitted 512. In some instances, the billing information transmitted 512 may include information about each of the communications transmitted and/or received. In other aspects, the billing agent may transmit billing information summarizing the information about the communications. It should be appreciated that the billing agent may not transmit 512 information for all communications captured. For instance, billing information may not be transmitted 512 for signaling or other similar types of communications.

In further aspects, billing agent may perform a more active monitoring 502 of communications transmitted from access device. As one example, billing agent may prevent certain types of communications from being transmitted and/or received by access device (e.g., voice over IP communications). Additional functions may also be performed by a device billing agent which monitors 502 communications transmitted and/or received by a access device.

Figure 6:
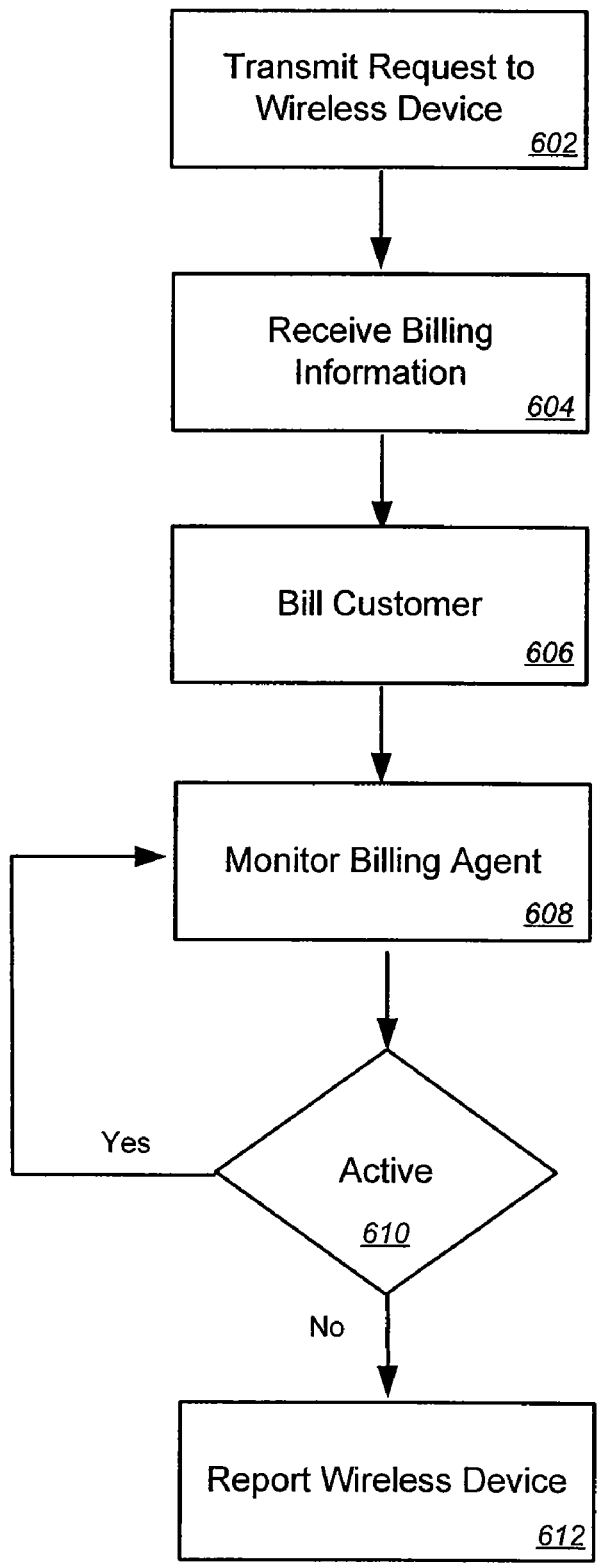
FIG. 6 is a flow diagram illustrating an exemplary method that may be used to bill customers of a wireless network provider or other type of network.

FIG. 6 illustrates an exemplary method that may be used to bill customers for communications transmitted and/or received by wireless devices. The method may also be used by other types of network providers to bill customers for communications transmitted and/or received by access devices using the network. In the embodiment of FIG. 6, a request is transmitted 602 to one or more wireless devices (or other type of access device) requesting billing information. The request may be transmitted 602 by a billing system or other system associated with a wireless network provider or other type of network provider. Billing information from one or more access devices may then be received 604. The billing information includes communication information for communications transmitted and/or received by access devices. As previously described, in alternative embodiments, the billing system may receive 604 the billing information at predetermined time intervals or real time, and thus block 602 may not be performed.

After the billing information is received 604, the billing system may authenticate the billing information. The billing system may use the received 604 billing information to bill 606 customers associated with wireless devices based at least in part on the billing information. The billing information 606 may be analyzed by the billing system to bill in accordance with an agreed billing model established between the customer and the wireless network provider. The analysis may include classifications of data transmitted by the access device, if not previously performed by device billing agent. In some aspects, billing system may consolidate multiple transmittals of billing information received 604 during a billing cycle into one bill. It should be appreciated that the billing system may bill 606 customers from pre-paid accounts, may generate bills to be paid by the customer, or may send information to another system to generate the bills.

Additional functions may also be performed to bill for communications. In one embodiment, wireless communications devices (or other type of access devices) may be monitored 608 to determine if the billing agents are active. The monitoring 608 may be performed by billing system or other system. A variety of mechanisms may be used to monitor 608 the billing agents. As one example, the billing agents may be determined 610 to be inactive if a wireless device fails authentication. A failed authentication may be detected when a wireless device attempts to access the wireless network or other event. The failed authentication may indicate an operating system on the wireless device has been re-installed or other event has occurred which may have disabled the device billing agent. As another example, a billing agent may be determined 510 to be inactive if it fails to respond to a request to transmit billing information or other request to verify that it is operating.

If the billing agent is determined 610 to be inactive, the access device may be reported 612 to the network provider. Alternatively or additionally, the access device may be prevented from accessing all or a portion of the services available on the network.

In the foregoing description, for the purposes of illustration, methods were described in a particular order. It should be appreciated that in alternate embodiments, the methods may be performed in a different order than that described. Additionally, the methods may include fewer, additional, or different blocks than those described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer program product stored on a computer-readable medium configured to store code/instructions operational by a processor of a computer system for detecting and billing a customer communication between a customer access device and a server of a network provider, the customer communication being generated at the customer access device by a customer of the network provider, the computer program product comprising:

code for capturing, by a billing agent at the customer access device, each customer communication to be transmitted from the customer access device, by routing each customer communication through the billing agent;

code for monitoring each captured customer communication for billing information;

code for determining the billing information about the communication, wherein the billing information is based on access to the secure network through the network provider; and code for transmitting, from the access device, the billing information to a billing system, the billing information including communication information for at least one communication transmitted from the access device, whereby, as a result of the transmitting step, the billing information is received by the billing system associated with the network provider and whereby the customer of the network provider is billed based at least in part on the billing information.

2. A method of detecting a communication between a customer access device and a server of a network provider, the communication being generated on behalf of a customer of the network provider, the method comprising:

capturing, by a billing agent at the customer access device, each communication to be transmitted from or received by the customer access device, by routing the communication through the billing agent;

monitoring at least one communication captured by the billing agent for billing information;

determining billing information for at least one communication captured by the billing agent, wherein the billing information is based on access to the secure network through the network provider; and transmitting, from the access device, the billing information to a billing system associated with the network provider, the billing system capable of billing the customer of the network provider based at least in part on the billing information.

3. The method of claim 2, wherein the billing agent is integrated with an operating system of the customer access device.

4. The method of claim 2, further comprising: transmitting the communication to a recipient.

5. The method of claim 4, wherein the device billing agent operates at a layer between a user application on the access device and an encryption layer, further comprising: encrypting the communication before transmitting the communication.

6. The method of claim 4, wherein the communication is transmitted over a secure network.

7. The method of claim 6, wherein the secure network comprises a virtual private network (VPN).

8. The method of claim 2, further comprising:

receiving a request from the billing system for the billing information; and wherein transmitting the billing information comprises transmitting the billing information in response to the request.

9. The method of claim 2, wherein transmitting the billing information comprises transmitting the billing information at a predetermined time.

10. The method of claim 9, further comprising:

determining additional billing information for a plurality of communications transmitted during a predetermined time interval; and transmitting the additional billing information at the predetermined time.

11. The method of claim 2, further comprising:

capturing, at the access device, a second communication received at the access device;

determining second billing information, the second billing information including information about the second communication; and transmitting the second billing information to the billing system.

12. The method of claim 2, further comprising before transmitting the billing information, encrypting the billing information.

13. The method of claim 2, wherein determining the billing information comprises determining a communication type associated with the communication.

14. The method of claim 13, wherein determining the communication type comprises determining the communication is one of a Multi-media Messaging Service (MMS) message, a Short Message Service (SMS) message, an Instant Message (IM), an email message, and a voice chat message.

15. The method of claim 2, wherein determining the billing information comprises determining a length of the communication.

* * * * *